United States Patent

Ziegler et al.

[11] Patent Number: 5,976,330
[45] Date of Patent: Nov. 2, 1999

[54] DEVICE FOR ELECTROCHEMICALLY MACHINING RECESSES

[75] Inventors: Gerhard Ziegler, Stuttgart; Hans Angermaier, Illingen, both of Germany

[73] Assignee: Robert Bosch GmbH, Stuttgart, Germany

[21] Appl. No.: 08/983,077

[22] PCT Filed: Jun. 12, 1997

[86] PCT No.: PCT/DE97/01189

§ 371 Date: Jan. 16, 1998

§ 102(e) Date: Jan. 16, 1998

[87] PCT Pub. No.: WO98/01255

PCT Pub. Date: Jan. 15, 1998

[30] Foreign Application Priority Data

Jul. 9, 1996 [DE] Germany .......................... 196 27 567

[51] Int. Cl.[6] .................................................... C25F 7/00
[52] U.S. Cl. ..................... 204/224 M; 204/275; 204/279
[58] Field of Search ....................... 205/672; 204/224 M, 204/279, 275

[56] References Cited

U.S. PATENT DOCUMENTS 3,647,671 3/1972 Abt ..................................... 204/224 M
3,705,843 12/1972 Sickels ................................ 205/672 X
3,769,194 10/1973 Haggerty ............................ 204/224 M Primary Examiner—Donald R. Valentine
Attorney, Agent, or Firm—Michael J. Striker

[57] ABSTRACT

An electrode (10) for performing an electrochemical treatment process has two cathode disks (35, 45) used as treatment locations for a component (55). By means of a return flow channel (23) formed parallel with the inflow bore (12), these two treatment locations are possible one behind the other, viewed in the axial direction of the electrode (10). Furthermore, the gaps (43, 45, 38, 39) located at both sides of the cathode disks (35, 45) have been embodied to be of different sizes. Together with the shape and the radius of the cathode disks (35, 45), contours with different sections are possible. The electrode (10) makes possible an economical production of components with specially shaped contours, and several contours in a single work step.

9 Claims, 3 Drawing Sheets

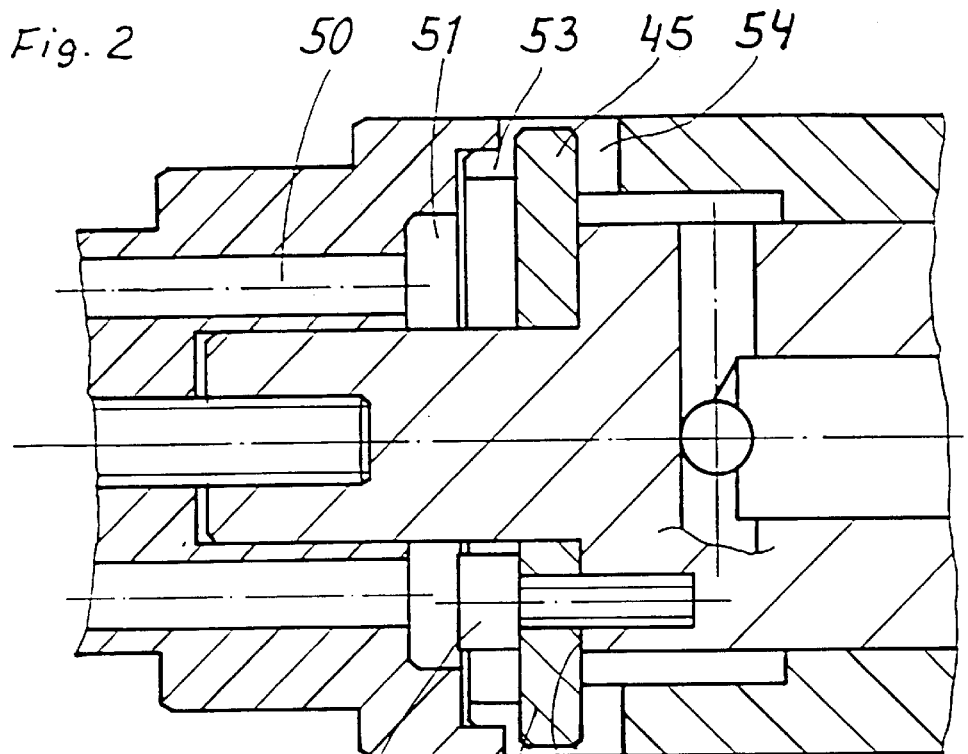
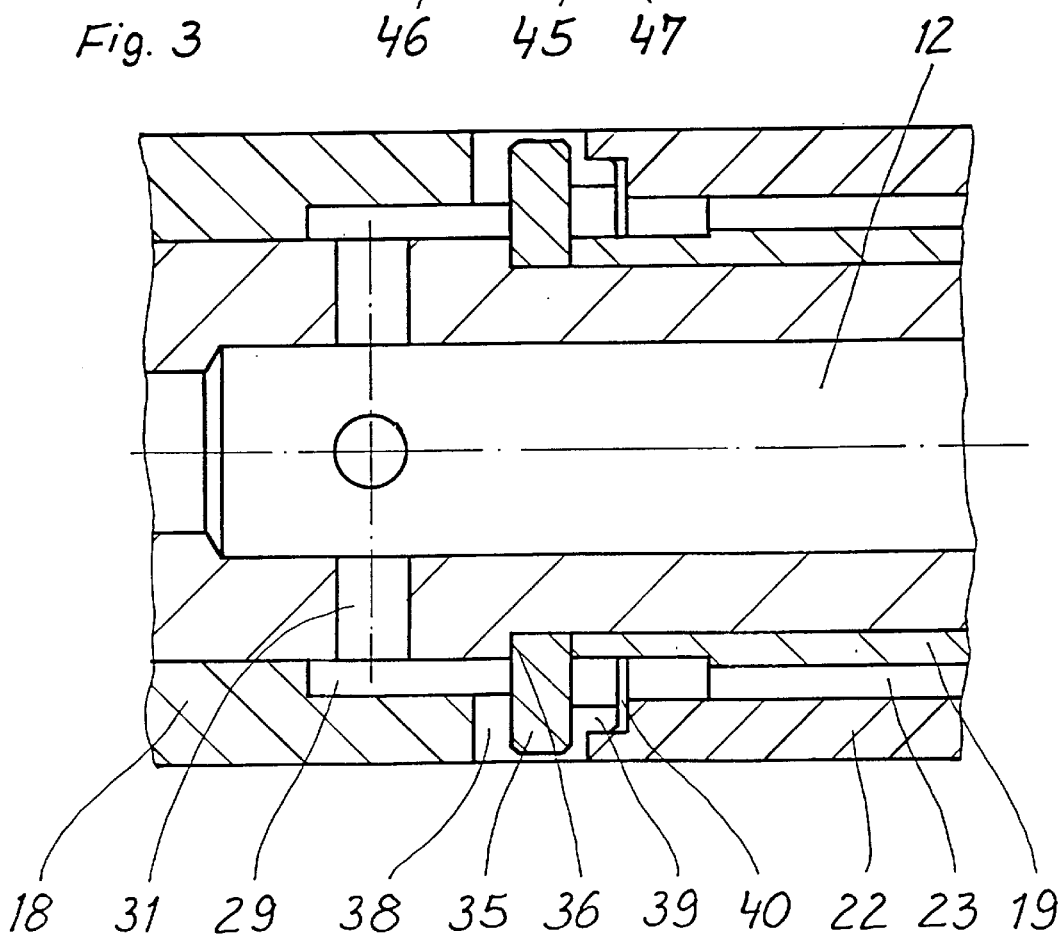

DEVICE FOR ELECTROCHEMICALLY MACHINING RECESSES

BACKGROUND OF THE INVENTION

The invention relates to a device for the electrochemical treatment of recesses at the inside of components. With devices known so far, the electrolyte solution is introduced into a feed bore of the electrode and is passed along the treatment element of the electrode. The electrolyte solution flows back via a drain bore which has been cut aligned with the feed bore. Because of this the electrode is relatively long and can therefore only find limited use.

SUMMARY OF THE INVENTION

In contrast thereto, the device in accordance with the invention for the electrochemical treatment of recesses has the advantage that a relatively space-saving design of the electrode is possible. Two treatment locations can be arranged one behind the other in a simple manner. Because of this it is possible to produce two contours simultaneously, i.e. in one work step. Because of this it is possible, in particular in connection with manufacturing on an industrial scale, to rapidly produce detailed contours of high quality. In particular, by means of adapting the shape of the electrode and the size of the working gap between the electrode and the workpiece, it is possible to produce contours of non-uniform depth and shape.

BRIEF DESCRIPTION OF THE DRAWINGS

An exemplary embodiment of the invention is represented in the drawings and will be explained in more detail in the following description. A longitudinal section through an electrode is represented in FIG. 1, an enlarged detailed representation of the first and second treatment position in FIGS. 2 and 3, a treatment position with the component arranged in FIG. 4, and a cathode disk in FIG. 5.

DESCRIPTION OF THE PREFERRED EMBODIMENT

Figure 1:
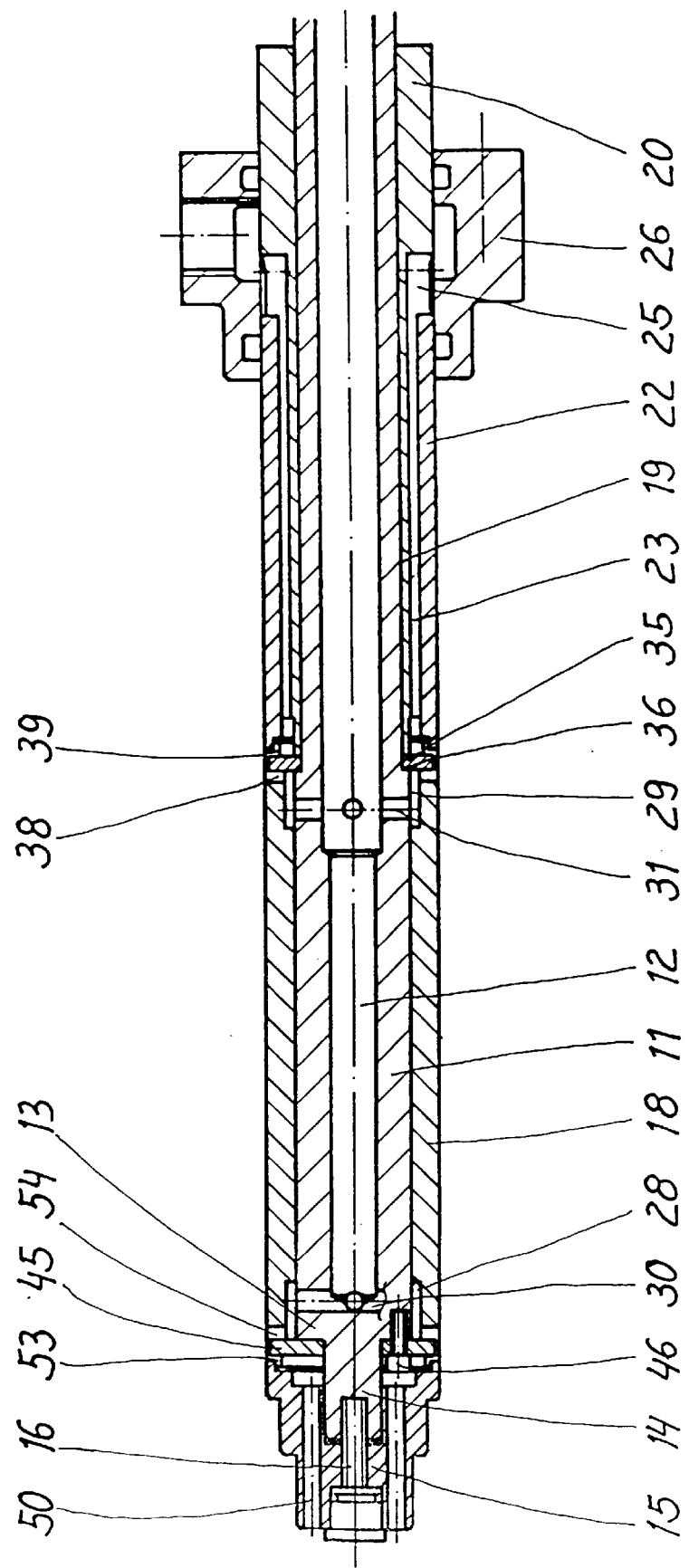

In FIG. 1 an electrode is identified by 10, whose support 11 is made of an electrically conducting material, for example brass and is used as the cathode for an electrochemical treatment process. The support 11 has a centered blind bore 12, which is used as the inlet for the electrolyte solution. An extension 14 is formed at the bottom 13 of the blind bore 12 in the support 11, on which a guide element 15 has been placed and fastened with the aid of a screw 16. Furthermore, a first protective sleeve 18 has been placed on the support 11, which rests against the exterior of the support 11. Following the protective sleeve 18, looking in the axial direction of the electrode 10, a bushing 19 of brass or other electrically conducting material rests against the exterior of the support 11. On its side facing away from the guide element 15, the bushing 19 has a collar 20 for fastening the electrode 10 on a bottom element, not represented, of a treatment installation. The electrode is connected with a power supply via the bottom element. Furthermore, the electrolyte solution is also fed to the blind bore 12 via the bottom element. A second protective sleeve 22 has been placed over the bushing 19 in such a way, that a circumferential channel 23 is created between the bushing 19 and the protective sleeve 22. Furthermore, viewed in the axial direction of the electrode 10, the protective sleeve 22 does not extend as far as the collar 20 of the bushing 19, so that a recess 25 is created between the collar 20 and the protective sleeve 22. This recess 25 is connected with the channel 23 and is surrounded by a cover element 26. Both protective sleeves 18 and 22 and the guide element 15 are made of an electrically non-conducting material, for example electrically insulating plastic.

Figure 5:
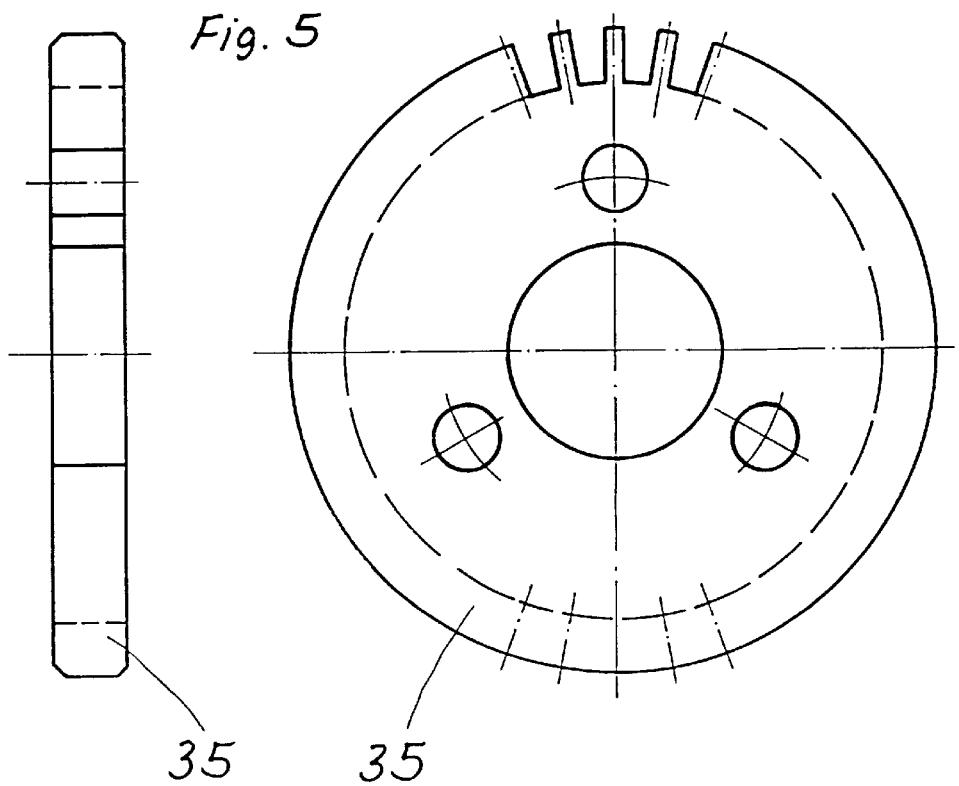

A circumferential annular groove 28, 29 each is formed on both ends on the interior of the protective sleeve 18 facing the support 11. Each annular groove 28, 29 is connected with the blind bore 12 with the aid of a transverse bore 30, 31 formed in the support 11. The blind bore 12 furthermore has a larger diameter from the opening until shortly past the transverse bore 31, than in the area toward the bottom 13. A cathode disk 35 of an electrically conducting material is arranged between the ends of the two protective sleeves 18, 22, which is seated on the support 11 and is pressed against a shoulder 36 formed on the support 11 with the aid of the guide element 19. As a function of the desired depth of the contour in the component to be treated, the cathode disk can extend until it ends flush with the exteriors of the protective sleeves 18 or 22. However, usually the radius of the cathode disk 35 is less than the exterior radius of the protective sleeves 18 to 22. As can be seen in FIG. 5, the cathode disk has the shape of a toothed wheel, wherein the desired contour in the component to be treated is determined by the shape and size of the teeth or respectively the tooth gaps.

As can be seen in more detail from FIG. 3, a first work gap 38 is located between the cathode disk 35 and the first protective sleeve 18, and a second gap 39 between the cathode disk 35 and the second protective sleeve 22. Therefore the flow of the electrolyte solution becomes possible from the blind bore 12, used as the inlet, through the transverse bore 31, the recess 29, the first gap 38 past the circumferential side of the cathode disk 35, the second gap 39, a depression 40 in the front of the protective sleeve 22 and the channel 23 to the return.

A second cathode disk 45, which is embodied the same as the cathode disk 35, has been placed on the extension 14 of the guide element 15 and has been fastened, resting against the guide element, on the shoulder 47 with the aid of three screws 46 as shown in FIG. 2. The radius of the second cathode disk 45 has also been embodied to be less than the radius of the first protective sleeve 18, or respectively the radius of the guide element 15. A continuous annular groove 50 is provided in the guide element 15 and terminates on the side facing the support 11 in a multiply stepped recess 51. A third gap 53 is provided between the cathode disk 45 and the guide element 15, and a fourth gap 54 between the cathode disk 45 and the protective sleeve 18. Therefore the flow of the electrolyte solution becomes possible from the blind bore 12 through the transverse bore 30 into the recess 28, the fourth gap 54, past the component, or respectively the exterior circumference of the second cathode disk 45, the third gap 53, through the recess 51 and the annular groove 50, used as a return.

Figure 4:
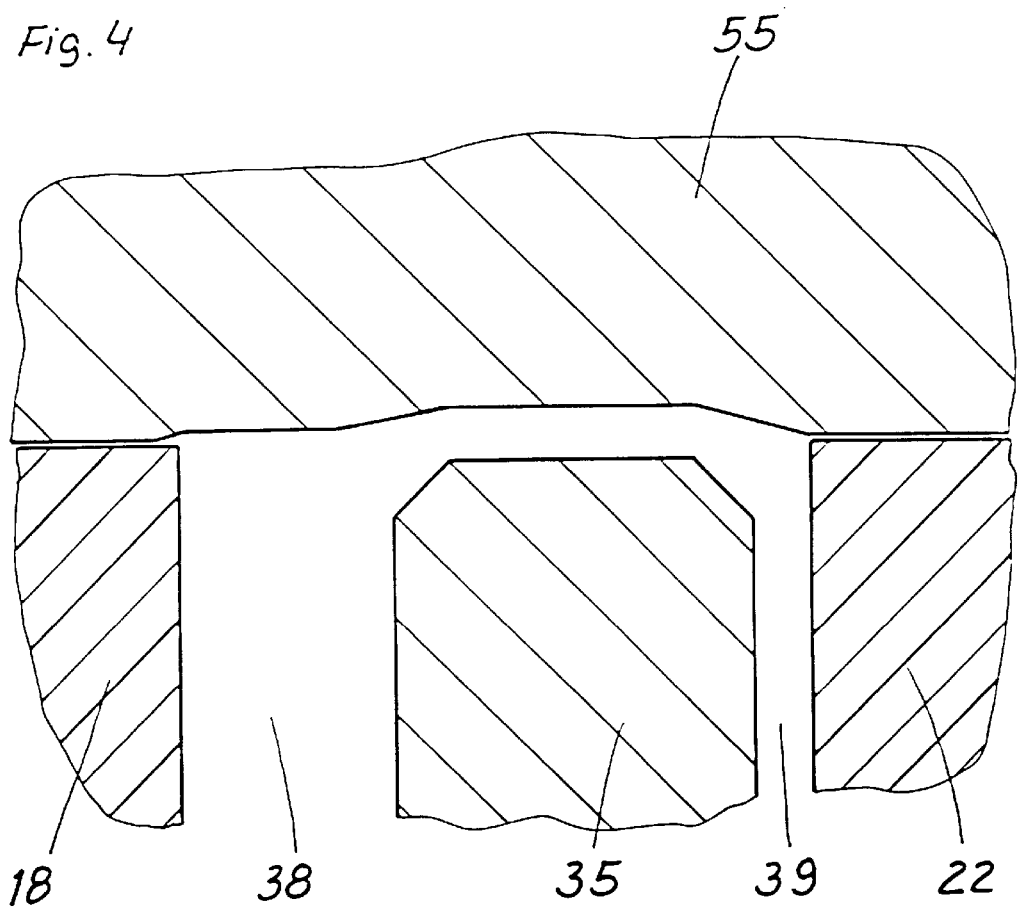

The matching of the shape of the cathode disk 45, or respectively 35 and the size of the first 38 and second gap 39 in connection with a defined desired contour of the component is explained in FIG. 4. It can be seen from FIG. 4 that the cathode disks have front faces extending toward each other, a circumference extending parallel with the axis and beveled transitions. By means of the electrochemical process, material is removed contact-free from the component to be treated, In the course of this the components are neither mechanically nor thermally stressed. Therefore no changes at all of the physical or chemical properties of the material used for the components occur. The removal is performed in accordance with Faraday's Law, wherein the amount removed is proportional to the product of current strength and length of the reaction.

The principle of the electrochemical process is based on applying a dc voltage to two electrodes which are in an aqueous electrolyte solution. To this end the component to be treated, in which a desired contour is to be formed, is connected with the positive pole (anode) of the current source with the aid of a transmission element while, as already mentioned above, the electrode, i.e. the support 11, is connected with the negative pole (cathode) of the current source by means of its electrically conductive properties. The composition of the electrolyte solution is of course dependent on the material of the component to be treated. With metals, for example, a salt solution or a sodium nitrate solution is selected. The electrochemical process is per se known from physics and therefore not explained in more detail here. Besides the composition of the electrolyte solution, the mode of operation is of course also determined by the current strength used, which in turn must be matched to the material of the component to be treated. If, for example, an aluminum cast alloy with, for example 8 percent by weight of silicon is used as the material of the component, the electrically non-conducting silicon crystals must be dissolved under a high electrolyte pressure of, for example 6 to 8 bar and a direct current voltage of approximately 15 V.

By controlling the size of the work gaps it is now possible to control the depth of the contour to be formed in the component 55. Differing from the previous way of operation it is also possible to create a non-uniform contour in the component 55. The larger the respective gap, the less the depth of the respectively associated area of the contour.

Because of the parallel return of the amount of electrolyte solution needed at the first treatment position, i.e. at the first cathode disk 35, it is possible to arrange several treatment positions, i.e. a cathode disk 35 and a cathode disk 45, one behind the other and in this way to make two treatment processes possible simultaneously and in a single work step. An economical manner of production is possible by means of this.

We claim:

1. A device for electrochemical treatment of recesses in an interior of components made of electrically conducting materials, the device comprising a support composed of an electrically conducting material; at least one disk arranged on said support, past which an electrolyte solution flows; means forming an inflow for the electrolyte solution; and means forming a return arranged so that the electrolyte solution is conducted through said return opposite to a direction of the inflow between said disk and a component, said means for forming the return being formed as a channel.

2. A device as defined in claim 1, wherein said means forming the inflow is formed as a bore in said support, said means for forming the return being formed as a channel which extends parallel to said bore.

3. A device as defined in claim 1; and further comprising a protective sleeve composed of an electrically non-conducting material, said means forming the return being a channel which is formed as a gap between said support and said protective sleeve.

4. A device as defined in claim 1; and further comprising another such disk, so that said disks include a first disk and a second disk.

5. A device as defined in claim 4, wherein said disks are arranged one behind the other as considered in an axial direction of said device.

6. A device as defined in claim 4; and further comprising at least a first and a second protective element composed of electrically non-conductive material and provided on said support, each of said protective elements being associated with a respective one of said disks so that a distance between one of said disks and a respective one of said protective elements being different than a distance from the other of said disks and the other of said protective elements.

7. A device as defined in claim 1; and further comprising at least a first and a second protective element composed of electrically non-conductive material and provided on said support.

8. A device as defined in claim 1; and further comprising another such disk so that a first and a second disk are provided, said means forming the inflow being formed as a bore, said bore in an area between said disks having a lesser diameter than in a remaining area.

9. A device for electrochemical treatment of recesses in an interior of components made of electrically conducting materials, the device comprising a support composed of an electrically conducting material; a first and a second disk arranged on said support, past which an electrolyte solution flows; means forming an inflow for the electrolyte solution; and means forming a return arranged so that the electrolyte solution is conducted through said return opposite to a direction of the inflow between said disk and a component, said means for forming the return being formed as a channel, said means for forming the inflow being formed so that the electrolyte solution is conducted in the direction of the inflow between said second disk and a component to the return.

* * * * *